(12) United States Patent
Song et al.

(10) Patent No.: US 11,815,988 B2
(45) Date of Patent: Nov. 14, 2023

(54) SYSTEM THAT AUTOMATICALLY RESPONDS TO EVENT ALARMS OR FAILURES IN IT MANAGEMENT IN REAL TIME AND ITS OPERATION METHOD

(71) Applicant: Infranics America Corp., Ridgefield Park, NJ (US)

(72) Inventors: Young Sun Song, Seoul (KR); Jee Yoon Song, Long Island City, NY (US); Neung Mo Koo, Gyeonggi-do (KR); Yi Hwan Jang, Fort Lee, NJ (US)

(73) Assignee: Infranics America Corp., Ridgefield Park, NJ (US)

( * ) Notice: Subject to any disclaimer, the term of this patent is extended or adjusted under 35 U.S.C. 154(b) by 0 days.

(21) Appl. No.: 17/474,215

(22) Filed: Sep. 14, 2021

(65) Prior Publication Data

US 2023/0032264 A1 Feb. 2, 2023

(30) Foreign Application Priority Data

Jul. 28, 2021 (KR) .................. 10-2021-0099053

(51) Int. Cl.
*G06F 11/00* (2006.01)
*G06F 11/07* (2006.01)

(52) U.S. Cl.
CPC ........ *G06F 11/079* (2013.01); *G06F 11/0718* (2013.01); *G06F 11/0751* (2013.01); *G06F 11/0772* (2013.01)

(58) Field of Classification Search
CPC ............... G06F 11/079; G06F 11/0718; G06F 11/0751; G06F 11/0772

USPC ...................................................... 714/1–57
See application file for complete search history.

(56) References Cited

U.S. PATENT DOCUMENTS

| | | | |
|---|---|---|---|
| 8,850,260 B1* | 9/2014 | Fuller ................. | G06F 11/0727 714/3 |
| 2003/0101382 A1* | 5/2003 | Gabele .................... | G06F 30/33 714/39 |
| 2003/0135382 A1* | 7/2003 | Marejka .............. | G06F 11/3495 714/100 |

(Continued)

FOREIGN PATENT DOCUMENTS

| KR | 10-1326451 B1 | 11/2013 |
|---|---|---|
| KR | 10-1545215 B1 | 8/2015 |

(Continued)

*Primary Examiner* — Sarai E Butler
(74) *Attorney, Agent, or Firm* — The PL Law Group, PLLC

(57) ABSTRACT

A system according to an embodiment of the present disclosure automatically responds to event alarms or failures in IT management in real-time and its operation method. The system provides a management object system accumulating responses IT managers made in case of issues including the event alarms, and the failures, wherein data is used as a learning data that suggests response measures for the event alarms or the failures through a status collector, a controller, and a linker, wherein future event alarms or failures, the learning data suggests the responding measures for corresponding phenomenon to the IT managers through a response measure suggester, and wherein responses are automatically made with a responder, where the responder is an artificial intelligence function.

7 Claims, 12 Drawing Sheets

(56) References Cited

U.S. PATENT DOCUMENTS

| | | | | |
|---|---|---|---|---|
| 2005/0246590 | A1* | 11/2005 | Lancaster | G06F 11/0781 714/47.2 |
| 2006/0048004 | A1* | 3/2006 | Kawashima | G03G 15/5075 714/23 |
| 2009/0217235 | A1* | 8/2009 | Suenbuel | G06F 11/366 717/124 |
| 2010/0275054 | A1* | 10/2010 | Grace | G06Q 10/10 714/2 |
| 2011/0170134 | A1* | 7/2011 | Murashima | G06F 11/0733 358/1.15 |
| 2012/0290870 | A1* | 11/2012 | Shah | H04W 12/35 714/E11.073 |
| 2014/0281700 | A1* | 9/2014 | Nagesharao | G06Q 10/00 714/15 |
| 2014/0337951 | A1* | 11/2014 | Lee | H04L 63/08 726/7 |
| 2015/0288557 | A1* | 10/2015 | Gates | G06F 11/0709 714/37 |
| 2016/0196174 | A1* | 7/2016 | Jacob | G06F 11/079 714/37 |
| 2016/0196194 | A1* | 7/2016 | Shih | G06F 13/4022 714/43 |
| 2017/0192870 | A1* | 7/2017 | Kangas | G06F 11/2236 |
| 2018/0203754 | A1* | 7/2018 | Beohar | G06F 40/30 |
| 2019/0146861 | A1* | 5/2019 | Joshi | G06F 11/0793 714/37 |
| 2019/0294484 | A1* | 9/2019 | Luo | G06N 20/00 |
| 2020/0293946 | A1* | 9/2020 | Sachan | G06N 5/04 |
| 2021/0150877 | A1* | 5/2021 | Menzel | G06Q 50/06 |
| 2021/0264301 | A1* | 8/2021 | Walker | G06F 16/9577 |

FOREIGN PATENT DOCUMENTS

| | | |
|---|---|---|
| KR | 10-1654986 B1 | 9/2016 |
| KR | 10-2016-0132698 A | 11/2016 |
| KR | 10-2234514 B1 | 3/2021 |

* cited by examiner

FIG. 6

| Agent List | | | | |
|---|---|---|---|---|
| Object Name: | | | Search | |
| | Object Name | IP Address | VM ID | Agent Installed | Agent Version |
| 1 | 481ceaee-3c43-4399-813b-7459fc72807 | 10.3.1.99 | | | |
| 2 | bmsh-001 | 172.27.39.229 | 84731350-9f00-4506-9369-22b60c099bacf | true | 1.0.11 |
| 3 | bmsh-vR | 14.63.168.59 | 0 | true | |
| 4 | bmsh-node1 | 172.37.76.219 | abd72e66-0212-4940-a586-a637851d8327 | true | |
| 5 | BSK | 1.234.83.19 | bsk | | |
| 6 | cancer-center-OB | 172.27.0.56 | cancer-center-OB | true | 1.0.12 |
| 7 | cancer-center-WEB | 172.37.0.193 | cancer-center-WEB | true | |
| 8 | CMS-manager | 172.27.201.61 | bxd6126-9f78-48c3-ad72-a30162c4b8b | true | |
| 9 | coms01 | 172.27.0.36 | coms01 | true | 1.0.11 |
| 10 | coms02 | 172.27.0.246 | coms02 | true | 1.0.13 |

System name →

Agent Version →

FIG. 10

SYSTEM THAT AUTOMATICALLY RESPONDS TO EVENT ALARMS OR FAILURES IN IT MANAGEMENT IN REAL TIME AND ITS OPERATION METHOD

CROSS-REFERENCE TO RELATED APPLICATIONS

This application claims priority to Korean patent application No. 10-2021-0099053, filed on Jul. 28, 2021, the disclosure of which is hereby incorporated by reference in its entirety.

BACKGROUND

1. Technical Field

The present disclosure is directed to a system that automatically responds to event alarms or failures in real-time and its operation method. Specifically, it allows real-time detection via smartphone application on the when of failure of the application subject to the management of the IT manager, and the analysis and measures are suggested via artificial intelligence, and if the automatic measure is required the artificial intelligence system that is the automatic control robot ordered by the application accesses the system to take the measures.

2. Background of the Invention

As a well-known fact, system failure, or failure refers to the status of the information, communication, or computer system that is unable to continue the process due to the abnormal behavior of hardware or software, and usually, they are caused by the software, including the operating system, more than the hardware.

If the error occurs to the system, the event alarm is occurred according to the preset rules, and the IT manager follows the manager-centered procedure of accessing the system to analyze the cause of the error and respond.

Also, the suggested operation method is that the management system with manuals registered per event to search the measures on the system when the event is occurred to respond automatically.

However, such methods follow the management to be involved from the beginning to the end of the operation to respond and manage the system.

Additionally, even though there is a suggestion of the method that automatically responds to the system, as the system automatically searches the storage with the responses for the events written by the operator and delivers the result to the operator, there is a limitation to taking automatic measures if it is an event that never occurred before.

To resolve these problems, the existing technology documents developed described below have been developed, but there is still a huge problem that cannot resolve the problems of the above existing technologies.

SUMMARY

The present disclosure is contrived to resolve the general problems of the above existing technology: its purpose is to equip the system that takes automatically responds to event alarms or failures (system failures) in IT management with the management system, status collector, controller, linker, response measure suggester, and ticket handling storage; other purpose of the present disclosure by the above technological composition is the real-time detection of the failure of system or application under the management of IT manager via the smartphone application, analysis and response is suggested via artificial intelligence, and if an automatic response is required the automatic control robot that is an artificial intelligence system ordered by the app accesses the system to respond; other purpose is that the historical data of the responses IT managers made with the problems occurring from the system subject to management, and the data is used for the learning of the system with artificial intelligence engine for the response measure by the situations, and the educated system suggests a suitable response to the issue when it occurs, and the system accesses the system that requires a response to automatically resolve the issue; other purpose is to automatize problem management, performance management, etc. of the IT system to take the role of IT operation center that executes system management and control 24 hours a day, and allowing control and response via smartphone application to allow implementation of virtual operation center that manages the system without the restriction of place; other purpose is that the responses the IT managers made when the event alarm, error, or problem occurs with the system subject to management as log data and the data is used as the learning data that suggests the responses for the events via the artificial intelligence system, and if the event or system failure occurs, the learned data suggests the measures to respond with the corresponding situation via response suggester to the IT manager, and it suggests the system and the operation method for the case of the event alarm or system failure of the object under the IT management that is designed to be automatically responded via the artificial intelligence system function. To achieve such purposes, the present disclosure is directed to a system that automatically responds to event alarms or failures in IT management in real-time, and the system provides a management object system accumulating responses IT managers made in case of issues including the event alarms, and the failures, wherein data is used as a learning data that suggests response measures for the event alarms or the failures through a status collector, a controller, and a linker, wherein future event alarms or failures, the learning data suggests the responding measures for corresponding phenomenon to the IT managers through a response measure suggester, and wherein responses are automatically made with a responder, where the responder is an artificial intelligence function.

In addition, the present disclosure is directed to a method of operating a system automatically responding to event alarms or failures in IT management in real-time. The method comprises setting and collecting, by a status collector, a status information of a management object system and stores collected status information on a status information storage; firing, by a controller, the event alarm and system failure alarm by an analysis of threshold related to accumulated data of the collected system status information; linking, by a linker, the event alarm or the system failure alarm issued from the controller with a response measure suggester; suggesting, by the response measure suggester, a measure when the alarm occurs or responds first by predicting alarm based on a data log; selecting, by a responder, between a manual response by an operator and an automatic response by a robot system; and writing and storing, by a ticket handling storage, a response of an IT manager for an issue.

As the detail explored above, the present disclosure is directed to a system that automatically responds to event alarms or failures in IT management in real-time and its operation method with a management system, status collector, controller, linker, response measure suggester, and ticket handling storage.

Also, the present disclosure accumulates the log of the responses of IT managers that they made to the issues of the system subject to management, and the data is learned by the system with artificial intelligence engine as response measures for situations, and the learned system suggests appropriate measures for the issue when it occurs, and the system accesses the system that requires a response to automatically resolve the issue.

In addition, the present disclosure automates the issue management and performance management, etc. of the IT system to take the role of IT operation center that executes system management and control 24 hours a day and allowing control and response via a smartphone application to allow implementation of virtual operation center that manages the system without the restriction of place.

Especially the present disclosure is a very useful to accumulate the responses the IT managers made when the event alarm, error, or problem occurs with the system subject to management log data, and the data is used as the learning data that suggests the responses for the events via the artificial intelligence system, and if the event or system failure occurs, the learned data suggests the measures to respond with the corresponding situation via response suggester to the IT manager, and it suggests the system and the operation method for the case of the event alarm or system failure of the object under the IT management that is designed to be automatically responded via the artificial intelligence system function.

The below is a detailed explanation of a desirable execution example of the present disclosure to achieve such effect as the following:

BRIEF DESCRIPTION OF THE DRAWINGS

FIG. 6 describes the current status sample with a collector agent installed on the system to collect the status of the system;

FIG. 10 describes the status of the link server of the present disclosure;

DETAILED DESCRIPTION

Figure 1:
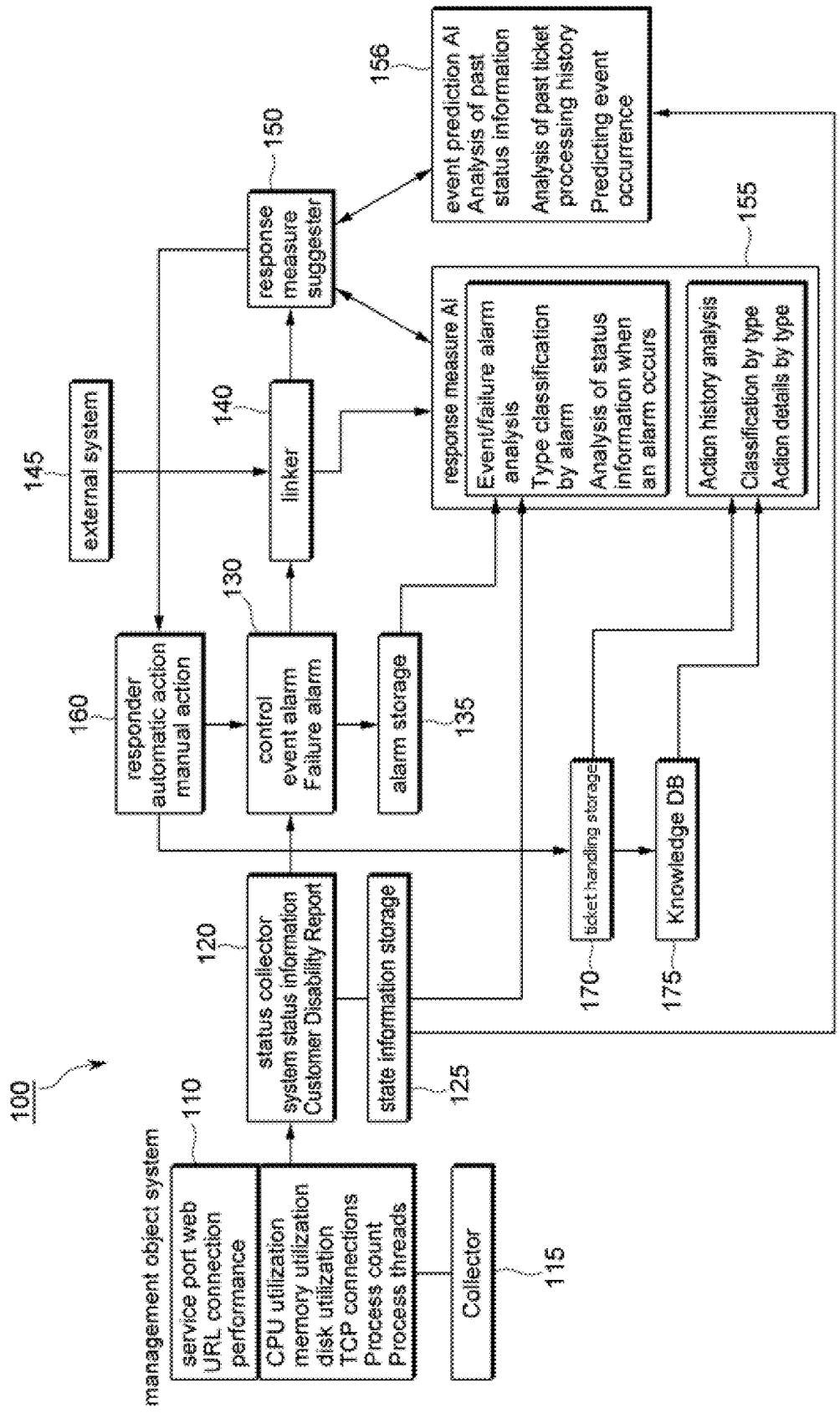
FIG. 1 describes the overall block diagram of the system that automatically responds to the event alarms or the failures in IT management in real-time.
Figure 2:
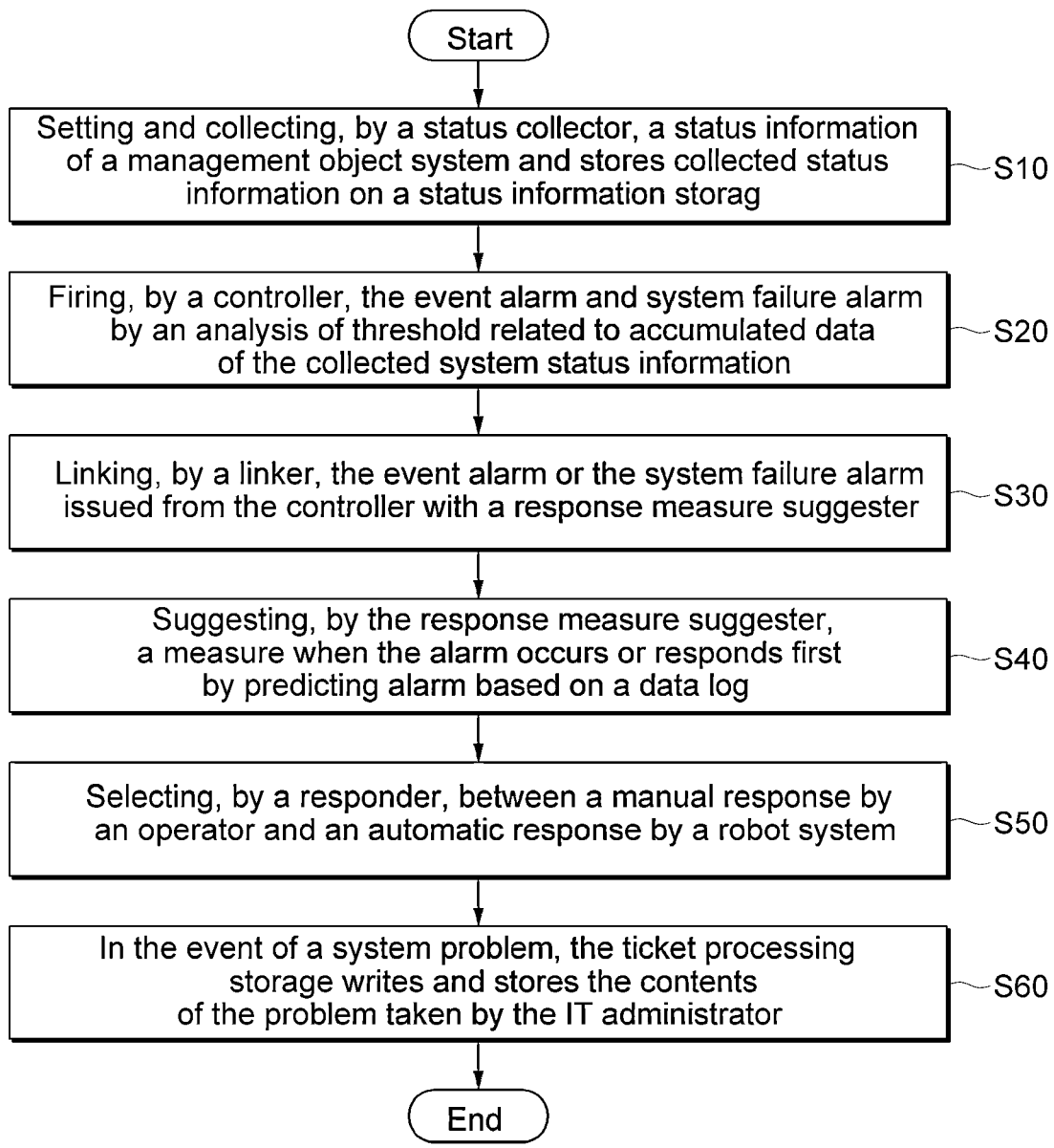
FIG. 2 describes a flowchart illustrating an embodiment of the present disclosure.

A system that automatically responds to event alarms or failures in IT management in real-time and its operation method applied to the present disclosure consists of the contents illustrated in FIG. 1 to FIG. 12.

About the explanation of the present disclosure written below, if the detailed explanation of the related notice function or the structure is considered to unnecessarily cloud the key points of the present disclosure, such explanation will be omitted.

And the terminologies mentioned below are set with the consideration of the functions of the present disclosure, and this may differ by the intention or the customs of the producer thus their definitions shall be defined with the basis of the overall content of this statement.

Also, the sizes and thicknesses displayed on the figures are randomly set for the convenience of explanation, thus the present disclosure is not always restricted to the illustration of the figure.

Firstly, the present disclosure is directed to a system that automatically responds to event alarms or failures in IT management in real-time 100. The system 100 provides a management object system 110 accumulating responses IT managers made in case of issues including the event alarms, and the failures, wherein data is used as a learning data that suggests response measures for the event alarms or the failures through a status collector 120, a controller 130, and a linker 1400, wherein future event alarms or failures, the learning data suggests the responding measures for corresponding phenomenon to the IT managers through a response measure suggester 150, and wherein responses are automatically made with a responder, where the responder 160 is an artificial intelligence function.

The system 100 mentioned above applied to the present disclosure is composed as the following:

The present disclosure is equipped with the management object system 110 that includes the system and application the IT manager is in charge of.

In addition, the present disclosure is linked with the management object system 110, and it is equipped with a status collector 120 that sets the definition of the name of the server under IT management, Server IP, the definition of collection object that displays the status of the server, object name, and status message.

At this time, it is desirable for the status collector 120 to be equipped with status storage 125 where the statuses of events or system failures, or both IT managers recognized are stored through the status collector.

And the present disclosure is linked with the status collector 120, and it is equipped with a controller 130 that the collected status information of the system sets the event alarm or the system failure set by the system failure reports made by the clients or the moderator's acknowledgment of the system failure.

Additionally, the present disclosure is linked with the controller 130, and it is equipped with a linker 140 that takes the role of sharing the data of the event alarms or the system failure caused by the controller with the response measure suggester.

At this moment, the above linker 140 links with external systems including the IT management system, collaboration system, etc., and takes the role of linkage gateway for mutual sharing of event or system failure alarm, utilizing necessary data, etc.

Moreover, the present disclosure is linked with the linker 140, and it is equipped with a response measure suggester 150 that suggests the response measures in case of the alarm and predicting the alarm based on the data log to suggest the prediction result to take prior measures.

Furthermore, the present disclosure is linked with a response measure suggester 150 and it is equipped with the responder 160 with a manual response that goes under the screening of the operator to prevent errors and the automatic response by robot systems.

And the present disclosure is linked with the responder 160, and it provides a system with a system that automatically responds to the event alarms or the system failures in IT management in real-time that includes a ticket handling storage 170 that writes and stores the contents of the response—that IT manager made in case of the problem with the system—in the format standardized to the ticket handling system.

At this time, the linker 140 could be linked with the external system 145 that includes the collaboration system that shares the issues, collaborations and results, KPI management, and ticket management.

Furthermore, the ticket handling storage 170 could be equipped with Knowledge DB 175 that stores the operators' operation guide.

Meanwhile, the system subject to management 110 applied to the present disclosure is equipped with the collector 115 that regularly collects the objects that display the status of the system subject to the management 100, that are the resource status, application port status, web URL performance, etc.

At this time, the collector 115 should include CPU usage rate, memory usage rate, disk usage rate, the number of TCP connections, the number of processes, the number of process threads, I/O traffic, etc.

Also, the response measure suggester 150 could be equipped with a response measure AI 155 and an event prediction AI, 156 when the event alarms or the system failure alarms occur, the controller requests the response measure to the response measure suggester through the linker, the response measure AI 155 delivers the result of the response measure drawn by the machine-learned response measure AI to the response measure suggester, the prediction alarm occurred by the event prediction AI is delivered to the controller, and the machine-learned response measure AI to suggest response measure through the linker under the consideration of the operator.

Meanwhile, regarding the application of the structure, the present disclosure could be changed in various ways and have multiple forms.

The present disclosure could be understood as a disclosure that is not restricted to a special form mentioned from the above-detailed explanation, and it actually could be understood as the spirit of the present disclosure defined by the attached list of claims and that includes all modified forms, equivalents, and replacements.

The explanation of the present disclosure's system that automatically responds to event alarms or failures in IT management in real-time and its operation method with the structure mentioned above is as follows.

First of all, the present disclosure is a very useful invention that: detects issues with the system and application subject to the management of IT manager in real-time via a smartphone application, provides analysis and response measures via artificial intelligence, and if automatic responses are necessary, it allows the automatic control robot that is the artificial intelligence system ordered by the application to access the system to respond.

FIG. 1 has been applied to the present disclosure for this reason and it shows the overall block diagram of a system that automatically responds to event alarms or failures in IT management 100, and it is equipped with the management object system 110, status collector 120, controller 130, linker 140, response measure suggester 150, responder 160, and ticket handling storage 170.

The operation method of the system that automatically responds to event alarms or failures in IT management 100 follows the following stages.

First of all, the present disclosure takes the step of the status collector 120 setting and collecting the management object system 110 and storing the collected status information on status information storage 125. (S10)

In this stage, all collected status information data mentioned above are categorized by the system, collected items then the status information collector 120 marks the collection time and store them chronically and this is used as the bigdata for the analysis of log and statistics in the future.

Then the present disclosure takes the stage that the controller 130 fires the event alarm and system failure alarm by the analysis of the threshold related to the accumulated data of the collected system status information. (S20)

In succession, the present disclosure takes the stage that the linker 140 links the event alarms or system failures issued from the controller 130 with the response measure suggester 150. (S30)

This is followed by the stage of the present disclosure that the response measure suggester 150 suggests a measure when the alarm occurs or responds first by predicting alarm based on the data log. (S40)

In this stage, in order to suggest the response measure, it learns the response measures in various situations based on the existing accumulated data, that is the data with ticket handling log and the collection data of status information.

Then the present disclosure follows the stage the responder 160 selects between the manual response by the operator and the automatic response by the robot system. (S50)

Lastly, the present disclosure the ticket handling storage 170 writes and stores the response of the IT manager for the issue in order to operate the system that automatically responds to the event alarms or system failures in IT management in real-time and its operation method. (S60)

At this time, regarding the responder 160, when the response measure is set to automatic for the system with event alarms or system failures, the response measures are delivered to the robot system for the automatic response and to access the target system included in the response measures it searches the information of the target system. The information of the target system includes the connection information such as the address, login ID and password, etc. of the system.

Additionally, the robot system accesses the acquired IP address that is the connection information of the target system, and logs in with the ID and password.

Furthermore, the robot system automatically enters the commands the operator enters based on the response content included in the response measures, and when the action is completed with the final command it notifies the result to the operator. In this case, the system failure alarm and the event alarms are automatically excluded from the control objects.

Meanwhile, the ticket handling storage 170's ticket handling log includes the time the system issue (the event alarms, the system failure or both) occurred, the time the response was made, the phenomenon of the issue, the system status information at the time the issue occurred, the cause of the issue and the content of the response, etc.

The details that need to be recorded include the appeared phenomenon of the issue of the target system, such as being unable to connect, intermittent connection failure, degradation of connection performance, unavailability of some applications, the time the issue occurred, and the time the response was made, etc.

It also records the applied OS, DB, WAS, Applications, etc.

And it records all information that exceeded the threshold among the system information at the time before and after the issue occurred.

When writing the response log, it records the commands used for logging into the system, checking status information, taking action, checking the normal status, etc. in command-level detail to utilize it as the data for AI to learn the response measures when the problem occurs.

Figure 3:
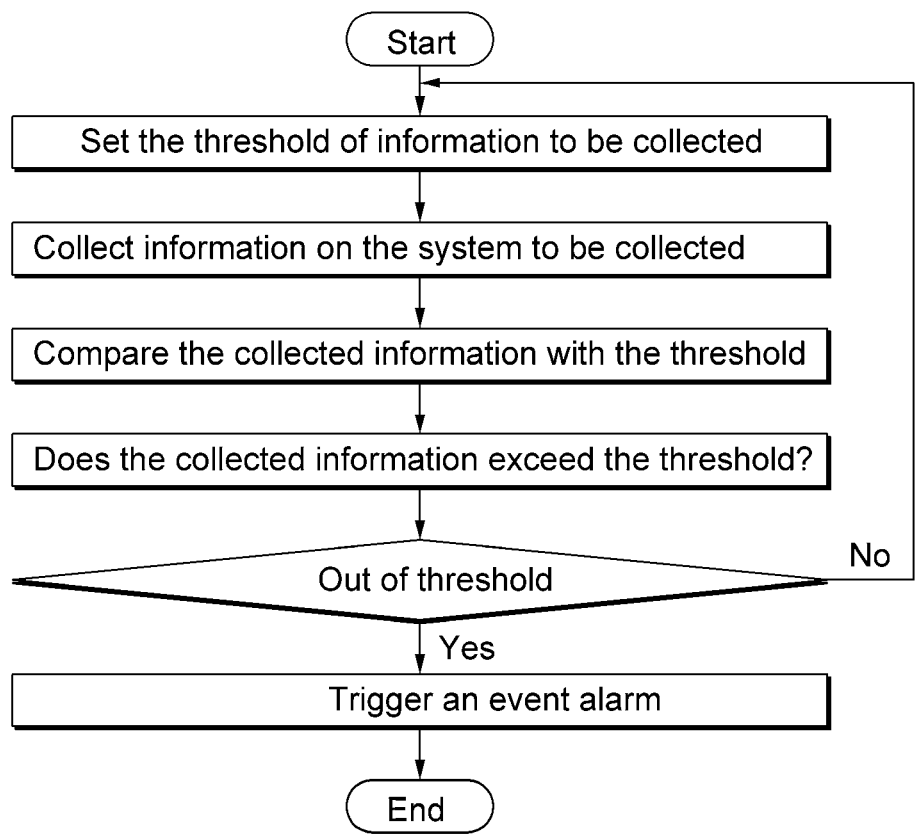
FIG. 3 describes a flowchart that sets the threshold value related to the data of each collected status information of this development.

Meanwhile, in addition, FIG. 3 shows the flowchart that sets the threshold value related to the data of each collected status information of this development.

The process of firing the event alarm in the stage of firing the event alarms and system failure alarms (FIG. 3) goes through the stage of setting the threshold of the information related to the collected data of the status information of the system.

This is followed by the stage of collecting the information of the system subject to the collection.

In succession, it goes through the stage of comparison of collected information and the threshold.

After that, it goes through the stage that determines if the collected information is off the threshold.

When the collected information is not off the threshold, it proceeds to the previous stage, and otherwise (when the collected information is off the threshold), it proceeds to the stage of firing the event alarm and the task is completed.

In this stage, the threshold is decided with the characteristics of each status information in consideration.

For example, if the number of TCP connections of a certain system is increased than the ordinary times and affects the service performance, it sets the number of TCP connections that affects the performance as the threshold and it becomes the condition that fires the event alarm.

On the other hand, if the number of normally operating processes is lower than a certain number and affects the service, it acts as the condition that fires the alarm when it is lower than the number of processes at ordinary times.

Figure 4:
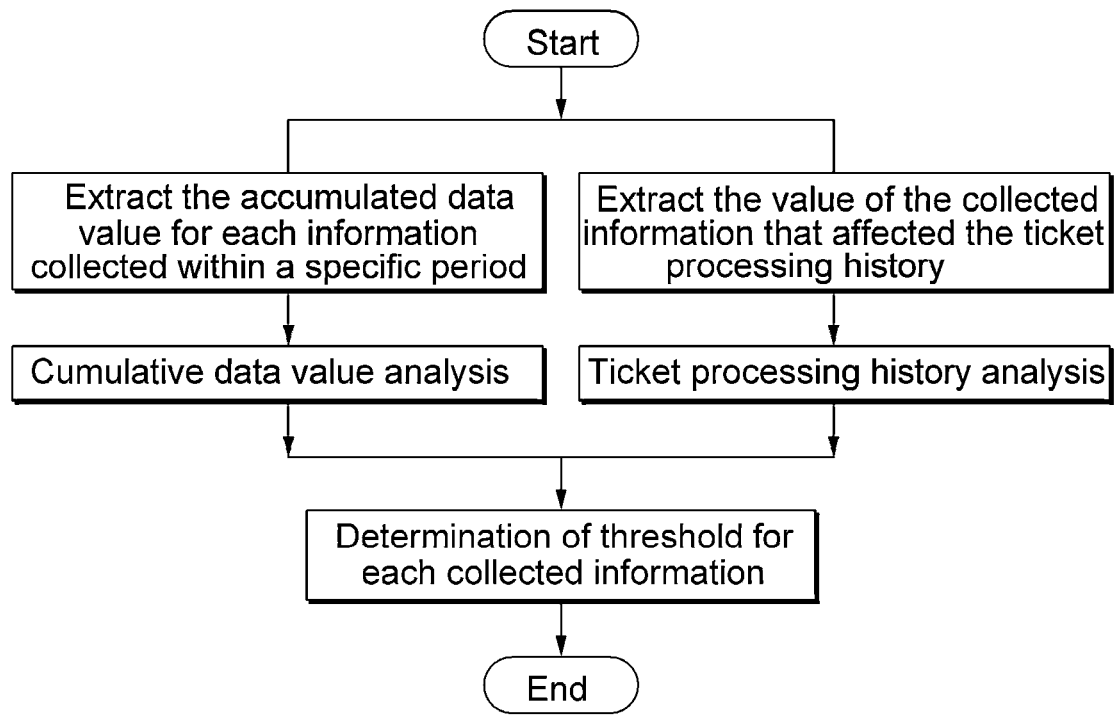
FIG. 4 describes a flowchart that analyzes all accumulated data of all collected status information to set the threshold for the present disclosure and makes decisions.

Meanwhile, FIG. 4 shows the flowchart that analyzes all accumulated data of all collected status information to set the threshold for the present disclosure and makes decisions.

That is, to set the threshold mentioned above, the decision is made by conducting analysis on the accumulated data of all collected status information or analyzing the ticket handling log. (FIG. 4)

In other words, analysis of accumulated data extracts the accumulated data value by collecting information in a certain period and after analyzing the accumulated data value, the thresholds for the collected information are decided before the task is completed.

Ticket handling log analysis extracts collected information value among the ticket handling log that affected the system, analyzes the ticket handling log, and sets the threshold for the collected information before the task is completed.

A more detailed explanation of this task is that it synthetically analyzes the status information value among the average value, normal distribution, dispersion, peak value, the value of performance measurement, and ticket handling log that affected the service performance to decide the threshold.

Additionally, the threshold sets the threshold value in several levels based on the level of severity to let the IT manager acknowledge it before it develops into a severe event.

The threshold value is subject to automatic change as it is the result of the analysis of the values of the recent period since the system environment may change by the passage of time.

On the other hand, the cases that fire the system failure alarm is as follows.

That is, it includes the case the clients experience the service influence first by the delay or system failures the clients experience while using the application, and the case the IT manager acknowledges it first while conducting an inspection, and such cases are received by the status information collector 120 and are made as an alarm at the controller 130. The controller 130 that displays the system failure then creates an alarm message with the system with the failure, the date of the occurrence, and the phenomenon to fire the system failure alarm and stores it on the alarm storage 135.

Meanwhile, the stage that the response measure suggester 150 suggests a response measure when the alarm is fired or predicts the alarm in prior based on the data of the past is as follows.

That is, the present disclosure utilizes response measure AI 155 and it 155 learns using the machine-learning method based on the ticket handling logs to be able to suggest response measure when the event alarms or system failure alarms are fired—the machine-learning method is a method to infer a function from the training data that includes the parameters of the input object in a vector form and displays the intended result; to create training data for AI to learn response measures in a given environment, it utilizes the data accumulated at ticket handling storage that the contents of the ticket that handled the events and the system failures are stored.

Figure 5:
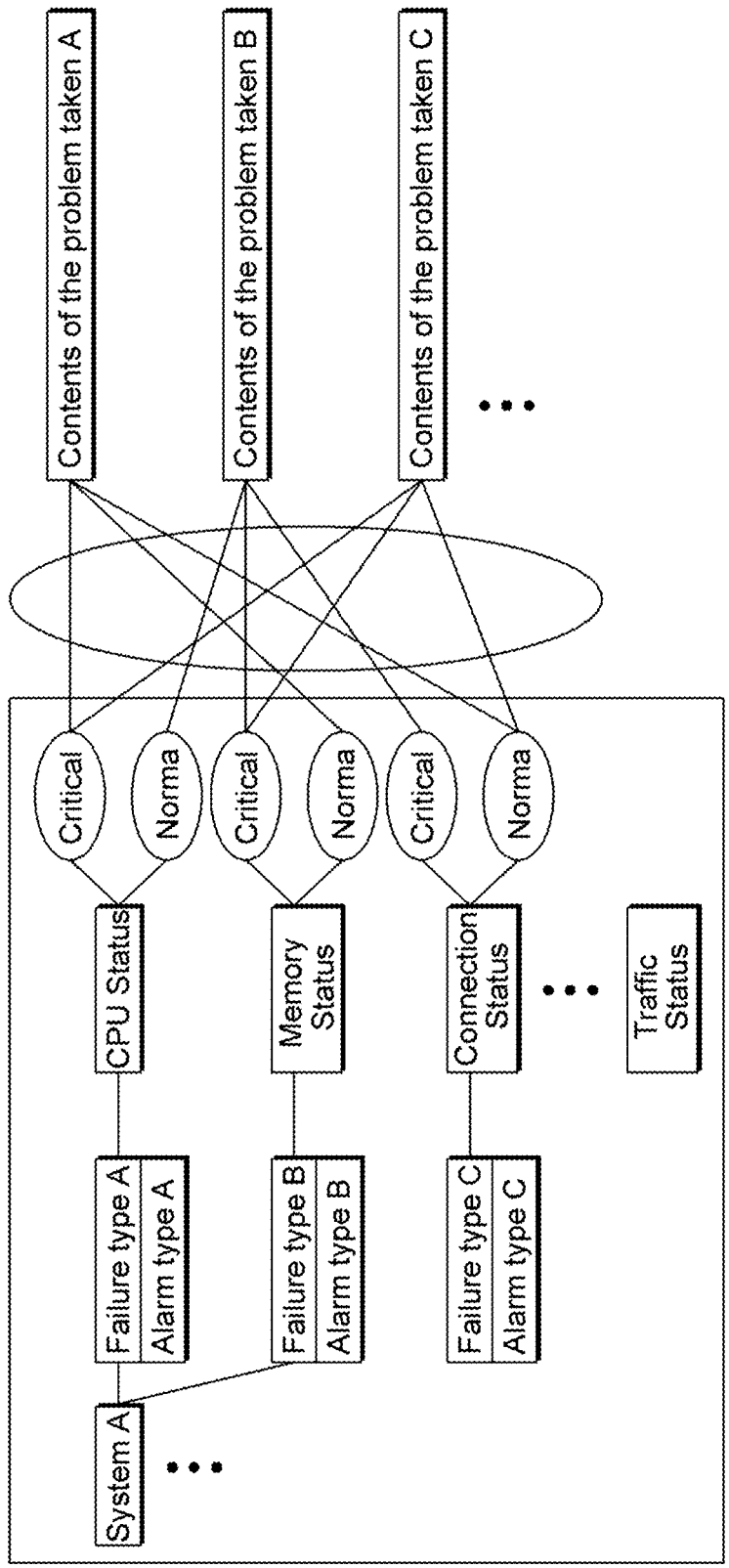
FIG. 5 describes a state diagram of the present disclosure that categorizes the status information by the type of event or failure alarm.

Meanwhile, FIG. 5 shows the state diagram of the present disclosure that categorizes the status information by the type of event/failure alarm.

That is, for the response measure learning, (FIG. 5) the contents of ticket handling are categorized by system object, alarm type, failure type, the current system status information; the responses are mapped by the categorized cases, and such data that is categorized by type is used for learning resources for response measures for various system statuses of the systems with issues.

The detailed explanation of the learning procedure is that a table that mapped the contents of the event alarms and the system failure alarms accumulated on alarm storage 135 and the system status information at the time the alarms are fired are created.

The AI learns from the actions made in case of status information that affected the system at the time of the event alarms or system failure alarms.

This learning is repeated until it corresponds with the contents the operator made through precision test.

As the operation procedure of the system is lengthened and if a new kind of form appears, it updates the learning data and the guide for the response measure follows the most recently updated contents.

Meanwhile, the stage response measure suggester 150 suggests a measure when the alarm occurs or responds first by predicting alarm based on the data log is as follows.

The present disclosure takes event prediction AI 156 to take the role of this stage, and this event prediction AI 156 uses time-series pattern analysis with the previous data to predict each status information's excess of their respective threshold.

In other words, it analyzes the pattern of the frequency of exceeding threshold by months, weeks, days of a week, or hours to predict when the event of each status information would occur.

To increase the precision of the prediction model, it differs the index for prediction of possible occurrence by the level of difference of frequency when analyzing it by months, weeks, days of a week, or days.

For example, if there is no deviation by months in the difference of frequencies, the index of months factor is set to 0, if there is a slight deviation by weeks, the index for weeks is set to 0.5, and if the deviation by hours is huge, the index of hour factor is set to 1 for application. The detailed number for the index by deviation and the when the level of threshold of the index would indicate the possible occurrence is decided by a separate analysis.

The closer the index to 1 is, the higher possibility the event of the status information that exceeded the threshold in the target period (month, week, day, hour) would occur is.

The possibility of system failure by type is decided by the combination of the status information that exceeded their threshold.

If the status information is expected to exceed their threshold at a certain time range, it predicts the system failure based on the learning result made by the table of status information at the time of event alarms/system failure alarm categorized by the effect of the status information and the types of system failures. In detail, by analyzing the development of status information by all system resources and performances—including CPU, Memory, Disk, Connections, Traffic, URL Performance, etc.—to predict the status information with expected abnormal behavior by exceeding their threshold at a certain period, and as this status information is the factors that can affect the system failure, it matches the predictions of excess of the threshold at a certain period with the table by system failure types to predict the system failure; this kind of training is repeatedly conducted.

The prediction of system failures or event alarms made with such process is transmitted to the controller, and it suggests the response measures through response measure suggester under the judgment of the IT manager.

Regarding the categorization of status information at the event/system failure alarm by type, the exploration of FIG. 5 is as follows.

First of all, the system failure can occur on the system (System A), and such system failure can be categorized by its type and matching it with the alarm. In other words, System Failure Type A is matched with Alarm Type A, and System Failure Type B is matched with Alarm Type B. For reference, the system failure type can be divided by the types of malfunction caused by the issue on the system.

The system failure type is connected with at least one object related to the cause (ex. CPU, Memory, Connection, Threads, etc.), and by the status of the objects, it can be sorted into two categories: Critical and Normal.

Response measure suggester 150 can draw out sorting or response log by types using response measure AI 155 or event prediction AI 156, and based on the matching response log, each object (CPU, Memory, etc.)'s system failure status (Critical or Normal) to suggest a suitable response. In conclusion, it can offer a response suitable for the system failure type.

According to the embodiment of the present disclosure, it can connect to a part of the objects that is related to the cause, etc., of a certain system failure type, and it can give a verdict as Critical or Normal by the status of the object.

In other words, a certain number of objects that are considered to be the most related object among the cause, etc. of a certain system failure type can be selected to match only them with the response log. This is to reduce wasting time and resources by taking response selectively on the objects considered to be highly related rather than all objects.

To be specific, the weight of the degree of relevance for each object can be set differently by the type of system failure. For example, for System Failure A, the weight of relevance for CPU is set at a1, Memory at a2, and Connection at a3, and for System Failure B, the weight of relevance for CPU can be set at b1, Memory at b2, and Connection at b3. And the order relation of weight values can differ, like a1>a3>a2, b2>a1>b3, etc. for example.

Meanwhile, FIG. 6 shows the current status sample with a collector agent installed on the system to collect the status of the system.

Figure 7:
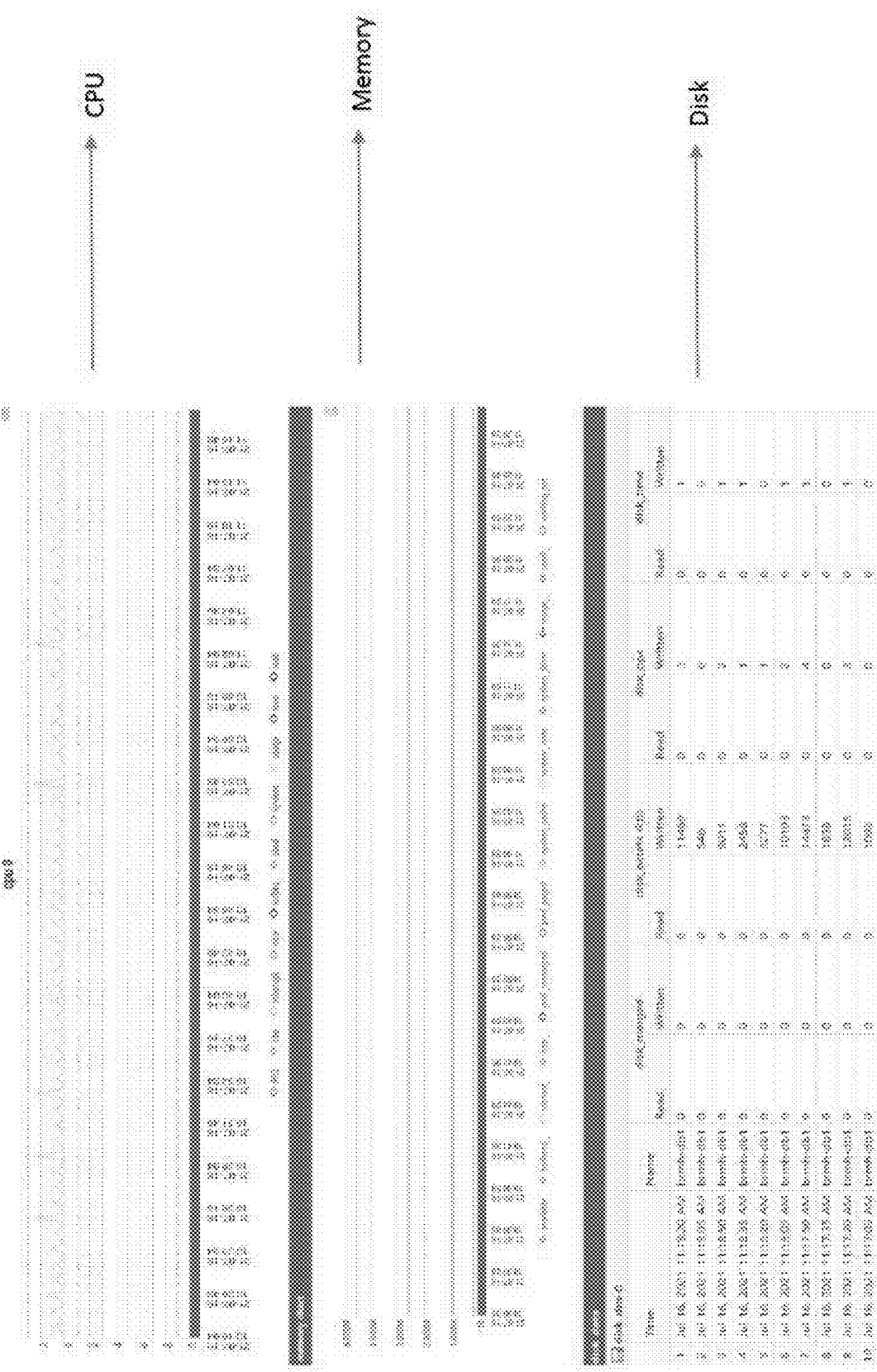
FIG. 7 describes a sample of the collected status of the present disclosure.

Also, FIG. 7 shows a sample of the collected status of the present disclosure.

Figure 8:
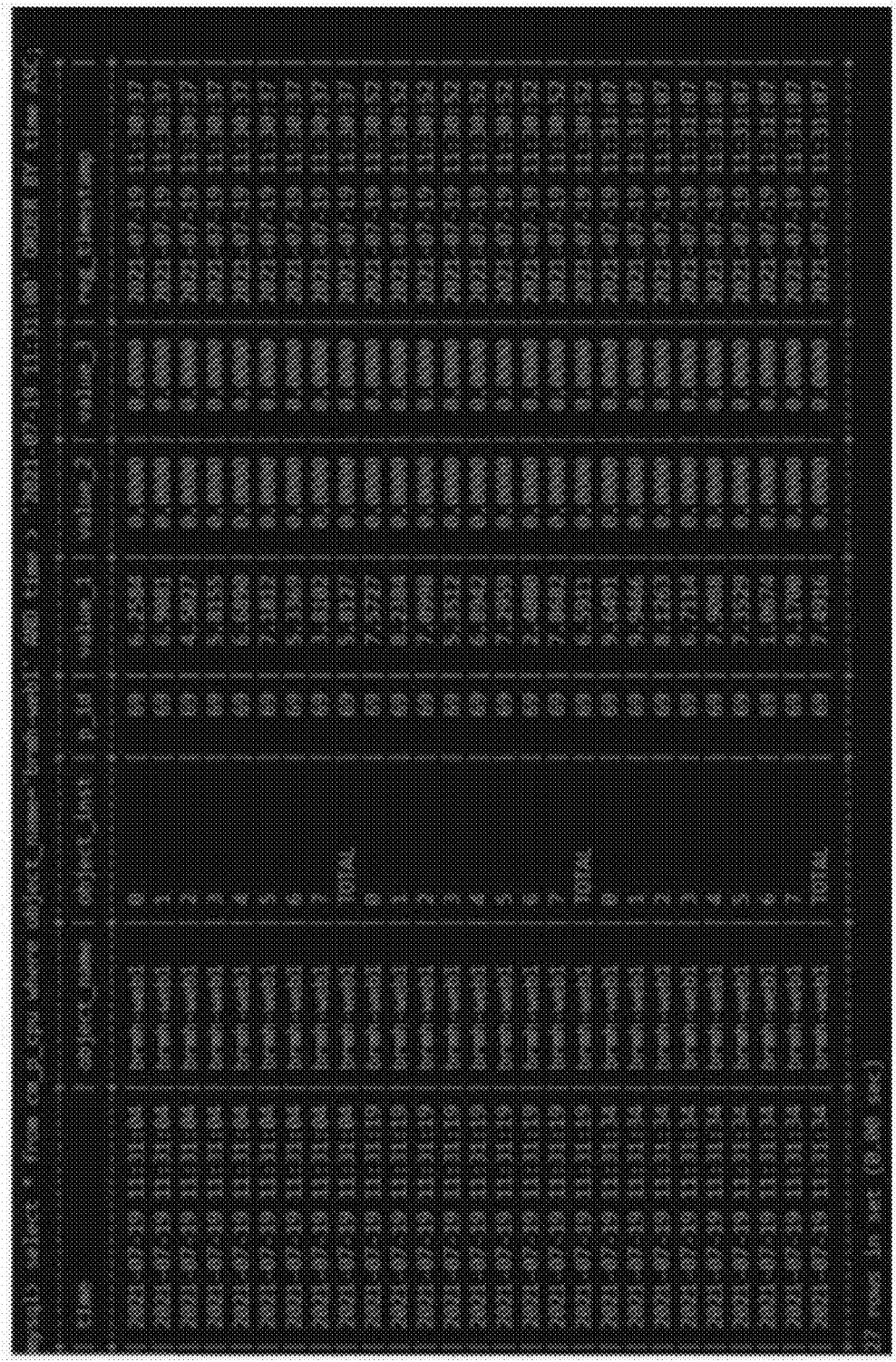
FIG. 8 describes a sample of stored status information (CPU) of the present disclosure.

And FIG. 8 shows a sample of stored status information (CPU) of the present disclosure.

Figure 9:
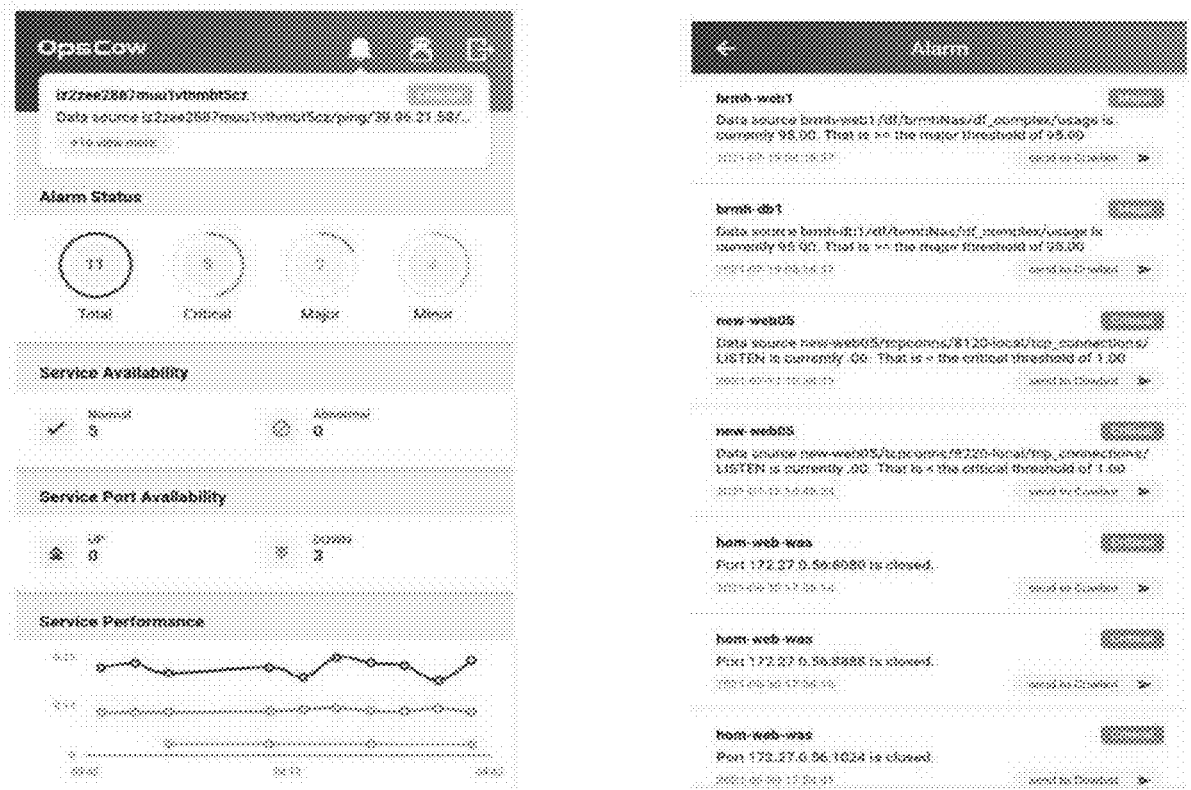
FIG. 9 describes the event alarm dashboard and event alarm list sample.

Additionally, FIG. 9 shows the event alarm dashboard and event alarm list sample of the present disclosure.

Figure 10:
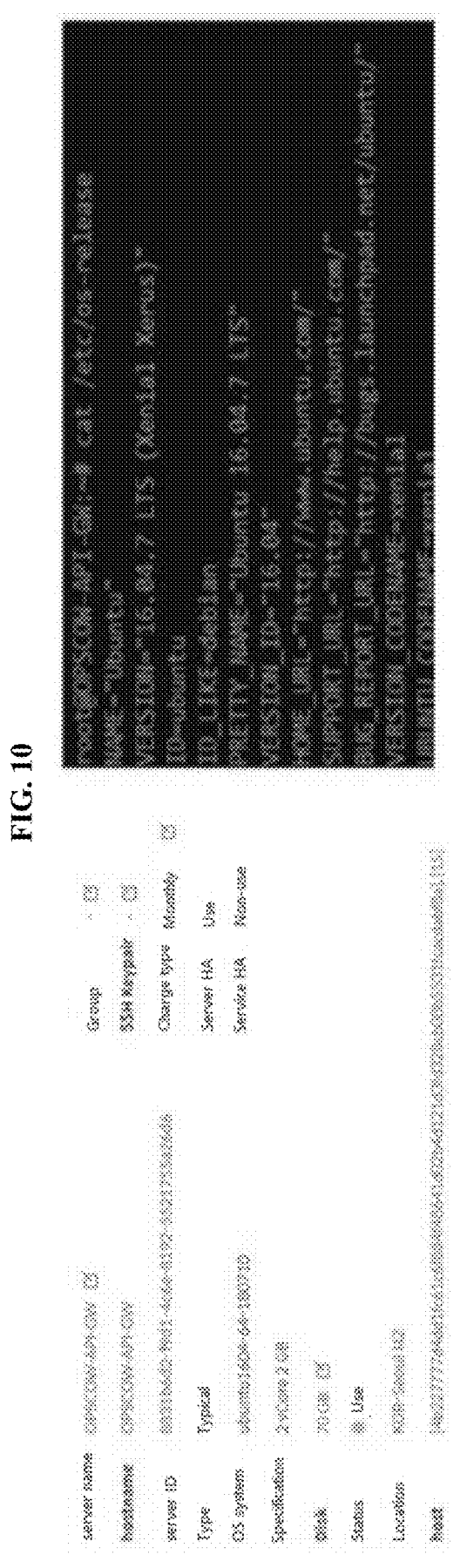

And FIG. 10 shows the status of the link server of the present disclosure

Figure 11:
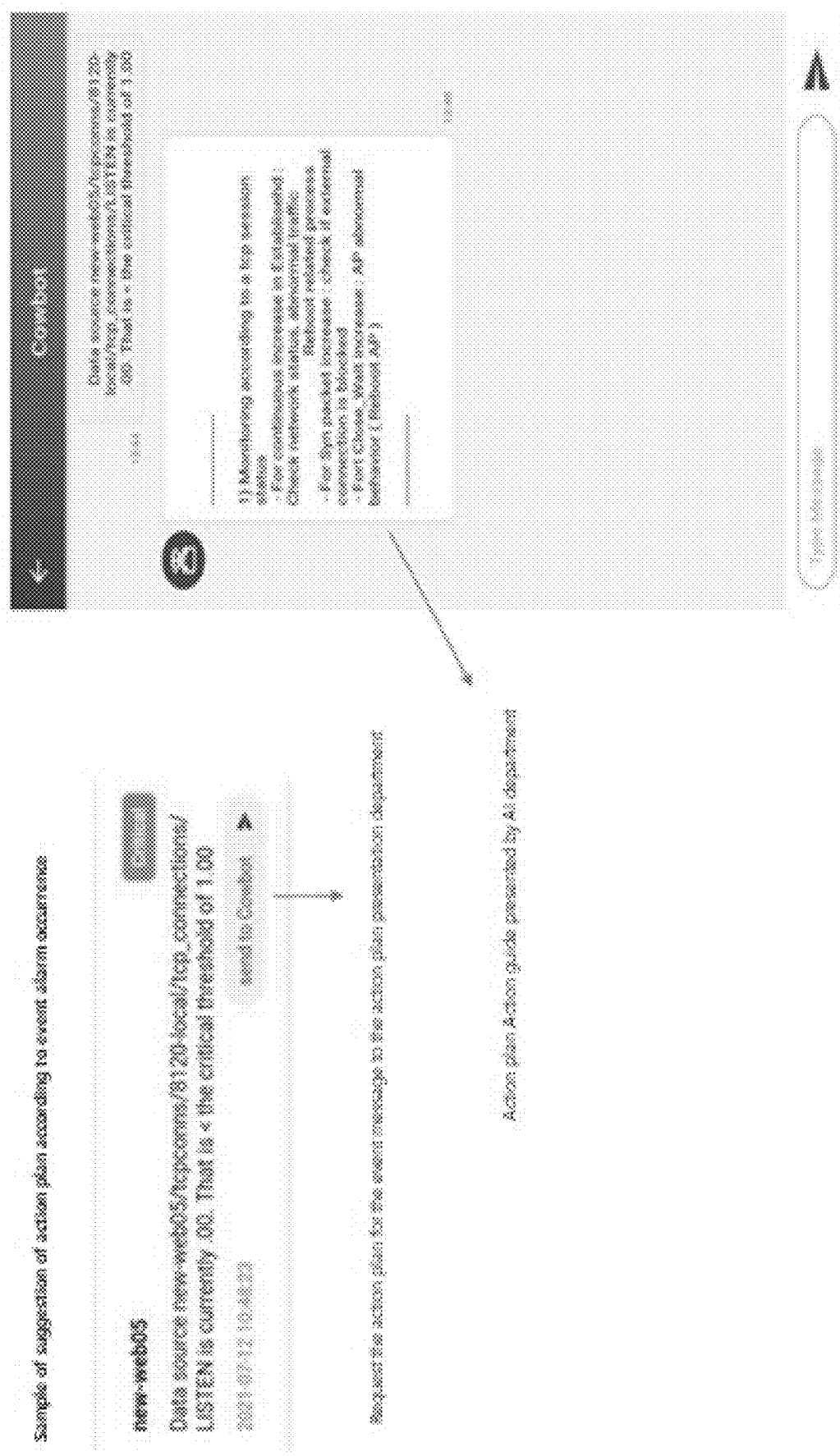
FIG. 11 describes the sample of response measures suggestion of the present disclosure in the case of event alarm.

Also, FIG. 11 shows a sample of response measures suggestion of the present disclosure in the case of event alarm.

As it can be seen from the abovementioned FIG. 11, when the event alarms, the system failure alarm, or both occur based on the collected information, etc., the response measure for the alarm can be requested at the response measure suggester 150. The response measure suggester 150 delivers this to response measure AI 155 to provide a response measure by analyzing the response log.

For reference, the occurrence of the event alarms may include not only the actual event alarms but also the event alarms fired by the analyzed result by the past status information analysis on the event prediction AI 156.

Figure 12:
FIG. 12 describes the ticket entry display and ticket handling storage database.

And FIG. 12 shows the ticket entry display and ticket handling storage database.

As mentioned above, the present disclosure detects the occurrence of systems and applications subject to the management of the IT manager in real-time and suggests analysis and response methods through AI, and if the automatic response is required, the automatic control robot, the AI system ordered by the application accesses the system to make a response, and the third purpose is that the historical data of the responses IT managers made with the problems occurring from the system subject to management, and the data is used for the learning of the system with artificial intelligence engine for the response measure by the situations, and the educated system suggests a suitable response to the issue when it occurs, and the system accesses the system that requires a response to offer the effect of automatically resolving the issue. The technological idea of the present disclosure, a system that automatically responds to event alarms or system failures in IT management in real-time and its operation method is practically capable of executing the same result repeatedly, and by executing the claimed invention it promotes the technological development to contribute to the industrial development, making it worth for protection.

What is claimed is:

1. A system for automatically responding to an event alarm and/or a failure in information technology (IT) management in real-time, the system comprising: a management object system configured for accumulating responses an IT manager made in case of issues including the event alarm and the failure, the management object system comprising a system and an application subject to a management of the IT manager; a status collector connected with the management object system, the status collector configured to collect status information of the management object system, set a definition of a name of a server under the IT management, an internet protocol (IP) of the server, a definition of an object to be collected that displays a status of the server, a name of the object, and a status message; a controller connected with the status collector, the controller configured to make the event alarm, based on the status information, and/or the failure set by a system failure report made by a client or an operator's acknowledgment of the failure; a linker connected with the controller, the linker configured to take a role of sharing data of the event alarm or the failure made by the controller with a response measure suggester; the response measure suggester connected with the linker, the response measure suggester configured to suggest a response measure in case of the event alarm and/or the failure and predict the event alarm and/or the failure, based on data log to suggest a proactive response measure; and a responder connected with the response measure suggester, the responder configured to: select between a manual response to prevent an error of the response measure and an automatic response by a robot system; deliver the response measure to the robot system for the automatic response; and search information of a target system to access the target system included in the response measure, wherein the information of the target system includes connection information including an IP address, a login identification (ID) and a password of the system; and a ticket handling storage comprising a non-transitory computer-readable medium connected with the responder, the ticket handling storage configured to write and store a content of responses that the IT manager made in case of a problem with the system, in a format standardized to a ticket handling system, wherein a ticket handling log of the ticket handling storage includes times the issues occurred, times the response were made, phenomena of the issues, system status information at the times the issues occurred, system information that exceeded a threshold at the times before and after the issues occurred, wherein the threshold is decided by: conducting analysis on accumulated data of collected status information by extracting accumulated data value from the accumulated data in a certain period and deciding the threshold based on the analysis on the accumulated data value; or analyzing the ticket handling log, wherein the threshold sets threshold values in several levels based on level of severity to let the IT manager acknowledge it before it develops into a severe event, wherein, if a number of transmission control protocol (TCP) connections of the management object system is increased than ordinary times and affects service performance, the number of TCP connections is set as the threshold and becomes a condition that fires an event alarm, wherein if a number of operating processes is lower than a certain number and affects service and is lower than the number of operating processes at ordinary times, it acts as a condition that fires the event alarm, wherein the data is used as a learning data that suggests the response measure for the event alarm or the failure through the status collector, the controller, and the linker, wherein the learning data suggests the response measure for a corresponding event alarm or failure to the IT manager through the response measure suggester, and the automatic response is made by the responder, where the responder has an artificial intelligence function, wherein the robot system accesses the target system by using the IP address of the target system, logging-in with the login ID and the password, and automatically enters commands the operator enters, based on a response content included in the response measure, wherein the learning data includes a table of the status information categorized by a system failure type, and, at a time of the event alarm and/or the failure, the event alarm and/or the failure are matched with the system failure type in the table, wherein the system failure type is connected with at least one object related to a cause, and by status of the at least one object, the system failure type is sorted into two categories including Critical and Normal, wherein the at least one object include a central processing unit (CPU), a connection and a memory, wherein the response measure suggester connect to a part of the at least one object related to the cause, and give a verdict as Critical or Normal by the status of the at least one object, wherein a certain number of objects that are considered to be a most related object among a cause of a certain system failure type can only be selected to match with the data log, and a weight of a degree of relevance for each object is set differently by the system failure type, wherein at least one of the management object system, the status collector, the controller, the linker, and the response measure suggester includes a hardware.

2. The system of claim 1, wherein the management object system further comprises a collector configured to regularly collect objects that display a status of the system.

3. The system of claim 1, wherein the response measure suggester comprises a machine-learned response measure artificial intelligence (AI) unit and an event prediction AI unit;

wherein, when the event alarm or the failure occur, the controller requests response measure to the response measure suggester through the linker, the machine-learned response measure AI unit draws and delivers a result of the response measure to the response measure suggester; and a prediction alarm occurred by the event prediction AI unit is delivered to the controller, and the machine-learned response measure AI unit suggests the response measure through the linker under a decision of the operator, wherein the event prediction AI unit uses time-series pattern analysis with previous data to predict each status information's excess of their respective threshold, the event prediction AI unit analyzes a pattern of frequency of exceeding threshold by months, weeks, days of a week, or hours to predict when the event of each status information would occur, wherein indexes for prediction of possible occurrence by level of difference of the frequency are different to increase precision of the prediction.

4. A method of operating a system automatically responding to an event alarm and/or a system failure alarm in information technology (IT) management in real-time, the method comprising: setting and collecting, by a status collector, a status information of a management object system and storing the status information on a status information storage; firing, by a controller, the event alarm and/or the system failure alarm by an analysis of threshold related to accumulated data of the collected status information; linking, by a linker, the event alarm or the system failure alarm issued from the controller with a response measure suggester; suggesting, by the response measure suggester, a response measure when the event alarm and/or the system failure alarm occur or respond first by predicting an alarm based on a data log; selecting, by a responder, between a manual response by an operator and an automatic response by a robot system; and writing and storing, by a ticket handling storage, a response of an IT manager for an issue, wherein the firing comprises: setting the threshold of information related to the collected status information of the system; collecting information of the system subject to the collection; comparison of the collected information and the threshold; determining if the collected information is off the threshold; and when the collected information is off the threshold, firing the event alarm and/or the system failure alarm, when the response measure is set to automatic for the system with the event alarm or the system failure alarm, delivering, by the responder, the response measure to the robot system for the automatic response and searching, by the responder, an information of a target system to access the target system included in the response measure, wherein the information of the target system includes connection information including an internet protocol (IP) address, a login identification (ID) and a password of the system; accessing, by the robot system, the target system by using the IP address, logging-in with the login ID and the password, and entering, by the robot system, automatically commands the operator enters based on a response content included in the response measure, wherein a ticket handling loci of the ticket handling storage includes times issues have occurred, times the response were made, phenomena of the issues, system status information at the times the issues occurred, system information that exceeded a threshold at the times before and after the issues occurred, wherein the threshold is decided by: conducting analysis on accumulated data of collected status information by extracting accumulated data value from the accumulated data in a certain period and deciding the threshold based on the analysis on the accumulated data value; or analyzing the ticket handling log, wherein the threshold sets threshold values in several levels based on level of severity to let the IT manager acknowledge it before it develops into a severe event, wherein, if a number of transmission control protocol (TCP) connections of the management object system is increased than ordinary times and affects service performance, the number of TCP connections is set as the threshold and becomes a condition that fires an event alarm wherein if a number of operating processes is lower than a certain number and affects service and is lower than the number of operating processes at ordinary times, it acts as a condition that fires the event alarm, wherein the data log is used as a learning data that suggests the response measure for the event alarm or the system failure alarm through the status collector, the controller, and the linker, wherein the learning data suggests the response measure for a corresponding event alarm or system failure alarm to the IT manager through the response measure suggester, and the automatic response is made by the responder, where the responder has an artificial intelligence function, wherein the learning data includes a table of the status information categorized by a system failure type, and, at a time of the event alarm and/or the system failure, the event alarm and/or the failure are matched with the system failure type in the table, wherein the system failure type is connected with at least one object related to a cause, and by status of the at least one object, the system failure type is sorted into two categories including Critical and Normal, wherein the at least one object include a central processing unit (CPU), a connection, and a memory; wherein the response measure suggester connect to a part of the at least one object related to the cause, and give a verdict as Critical or Normal by the status of the at least one object, wherein a certain number of objects that are considered to be a most related object among a cause of a certain system failure type can only be selected to match with the data log, and a weight of a degree of relevance for each object is set differently by the system failure type.

5. The method of claim 4, wherein the suggesting is functioned by a response measure AI unit; and
the response measure AI unit learns using a machine-learning method based on ticket handling logs to be able to suggest the response measure when the event alarm or the system failure alarm is fired; and
the machine-learning method is a method to infer a function from training data that includes parameters of an input object in a vector form and displays an intended result, to create training data for AI to learn the response measure in a given environment, and utilizes data accumulated at the ticket handling storage that contents of a ticket that handled the event alarm or the system failure alarm is stored.

6. The method of claim 5, wherein, for learning the response measure, the contents of the ticket are categorized by a system object, an alarm type, a failure type, current system status information, the response measure is mapped by categorized cases, and categorized data is used for learning resources for the response measure for system statuses of the system with the issue.

7. The method of claim 4, wherein the suggesting is functioned by an event prediction AI unit, and the event prediction AI unit uses time-series pattern analysis with previous data to predict each status information's excess of their respective threshold.

* * * * *